United States Patent
Jones et al.

(10) Patent No.: US 8,899,008 B2
(45) Date of Patent: Dec. 2, 2014

(54) SYSTEM AND METHOD FOR HEAT RECOVERY IN A GAS TURBINE ENGINE

(75) Inventors: Douglas Alan Jones, Bellaire, TX (US); Gerardo Plata Contreras, Santiago de Queretaro (MX); Robert Allen Baten, Baytown, TX (US); Victor Gerardo Cabal Velarde, Santiago de Queretaro (MX); Jingmei Zhang, Sugar Land, TX (US); Jesus Elios Almendarez Mendez, Santiago de Queretaro (MX); Richard Michael Watkins, Spring, TX (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 13/471,926

(22) Filed: May 15, 2012

(65) Prior Publication Data

US 2013/0305737 A1 Nov. 21, 2013

(51) Int. Cl.
 *F02C 7/047* (2006.01)
 *F02C 7/08* (2006.01)
 *F02C 7/057* (2006.01)

(52) U.S. Cl.
 CPC .............. *F02C 7/047* (2013.01); *F02C 7/057* (2013.01); *F02C 7/08* (2013.01)
 USPC ............ 60/39.093; 60/39.24; 60/266; 60/779

(58) Field of Classification Search
 CPC ............. F02C 7/047; F02C 7/057; F02C 7/08
 USPC ......... 60/39.093, 39.24, 266, 779; 244/134 R
 See application file for complete search history.

(56) References Cited

U.S. PATENT DOCUMENTS

| | | | |
|---|---|---|---|
| 3,353,360 A * | 11/1967 | Gorzegno | .................. 60/39.182 |
| 3,953,966 A | 5/1976 | Martz et al. | |
| 3,965,675 A | 6/1976 | Martz et al. | |
| 3,992,876 A | 11/1976 | Aguet | |
| 4,160,805 A | 7/1979 | Inaba et al. | |
| 4,261,167 A | 4/1981 | Paull et al. | |
| 4,353,206 A | 10/1982 | Lee | |
| 4,354,347 A | 10/1982 | Tomlinson et al. | |
| 4,394,813 A | 7/1983 | Tanaka et al. | |
| 4,501,233 A | 2/1985 | Kusaka | |
| 4,754,607 A * | 7/1988 | Mackay | .......................... 60/723 |
| 5,706,644 A * | 1/1998 | Nielsen | ........................... 60/783 |
| 2010/0031624 A1 * | 2/2010 | Austin et al. | .................. 60/39.5 |
| 2011/0138770 A1 * | 6/2011 | Bryant | ....................... 60/39.092 |
| 2011/0247313 A1 * | 10/2011 | Chillar et al. | ............... 60/39.093 |

OTHER PUBLICATIONS

Majed Sammak, Anti-Icing in Gas Turbines (2006), Lund Institute of Technology.*

* cited by examiner

*Primary Examiner* — Ehud Gartenberg
*Assistant Examiner* — Jason H Duger
(74) *Attorney, Agent, or Firm* — Fletcher Yoder P.C.

(57) ABSTRACT

A system includes an anti-icing heat recovery system, which includes a first heat exchanger, a second heat exchanger, and a variable speed fan. The first heat exchanger is configured to receive a working fluid from an exhaust section of a gas turbine engine and to transfer heat from the working fluid to a cooled intermediate heat transfer medium to generate a heated intermediate heat transfer medium. The second heat exchanger is configured to receive the heated intermediate heat transfer medium from the first heat exchanger and to transfer heat from the heated intermediate heat transfer medium to air entering the gas turbine engine. The variable speed fan is configured to urge the working fluid from the exhaust section of the gas turbine engine through the first heat exchanger.

18 Claims, 5 Drawing Sheets

SYSTEM AND METHOD FOR HEAT RECOVERY IN A GAS TURBINE ENGINE

BACKGROUND OF THE INVENTION

The subject matter disclosed herein relates to gas turbine engines, and more particularly, to systems and methods for heat recovery in a gas turbine engine.

Gas turbine engines may include, in serial flow arrangement, a compressor for compressing air flowing through the engine, a combustor in which fuel is mixed with the compressed air and ignited to form a hot gas flow, and a turbine driven by the hot gas flow. The compressor, combustor, and turbine are sometimes collectively referred to as a core engine. Such gas turbine engines may also include a low-pressure turbine or power turbine for transmitting power generated by the core engine to a driven component, such as a generator, for example. Unfortunately, low temperature air entering the core engine may cause ice to form in, or upstream of, the compressor, leading to inefficient operation of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine and an anti-icing heat recovery system. The anti-icing heat recovery system includes a first heat exchanger, a second heat exchanger, and a variable speed fan. The first heat exchanger is configured to receive a working fluid from an exhaust section of the gas turbine engine and to transfer heat from the working fluid to a cooled intermediate heat transfer medium to generate a heated intermediate heat transfer medium. The second heat exchanger is configured to receive the heated intermediate heat transfer medium from the first heat exchanger and to transfer heat from the heated intermediate heat transfer medium to air entering a gas turbine engine. The variable speed fan is configured to urge the working fluid from the exhaust section of the gas turbine engine through the first heat exchanger.

In a second embodiment, a system includes an anti-icing heat recovery system, which includes a first heat exchanger, a second heat exchanger, and a variable speed fan. The first heat exchanger is configured to receive a working fluid from an exhaust section of a gas turbine engine and to transfer heat from the working fluid to a cooled intermediate heat transfer medium to generate a heated intermediate heat transfer medium. The second heat exchanger is configured to receive the heated intermediate heat transfer medium from the first heat exchanger and to transfer heat from the heated intermediate heat transfer medium to air entering the gas turbine engine. The variable speed fan is configured to urge the working fluid from the exhaust section of the gas turbine engine through the first heat exchanger.

In a third embodiment, a method includes adjusting a fan speed of a variable speed fan. The variable speed fan is configured to urge a working fluid from an exhaust section of a gas turbine engine through a first heat exchanger, which is configured to transfer heat from the working fluid to a cooled intermediate heat transfer medium to generate a heated intermediate heat transfer medium for heating air entering a compressor of the gas turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to anti-icing heat recovery systems and methods for reducing ice formation in a gas turbine engine. In certain embodiments, the anti-icing heat recovery system includes a variable speed fan for urging exhaust gases from an exhaust section of the gas turbine engine through a first heat exchanger to heat an intermediate heat transfer medium. The heated intermediate heat transfer medium flows from the first heat exchanger to a second heat exchanger. The second heat exchanger is configured to transfer heat from the heated intermediate heat transfer medium to air entering the gas turbine engine. The higher temperature air may reduce the formation of ice within a compressor inlet of the gas turbine engine during icing conditions. The fan speed of the variable speed fan is proportional to the heat transferred from the exhaust gases, through the intermediate heat transfer medium, to the incoming air. A controller may adjust the fan speed of the variable speed fan based on sensor feedback from sensors located throughout the system. The controller may control the fan speed such that the temperature of the incoming air is increased, while maintaining the temperature of the exhaust gas above an acid dew point threshold value.

Figure 1:
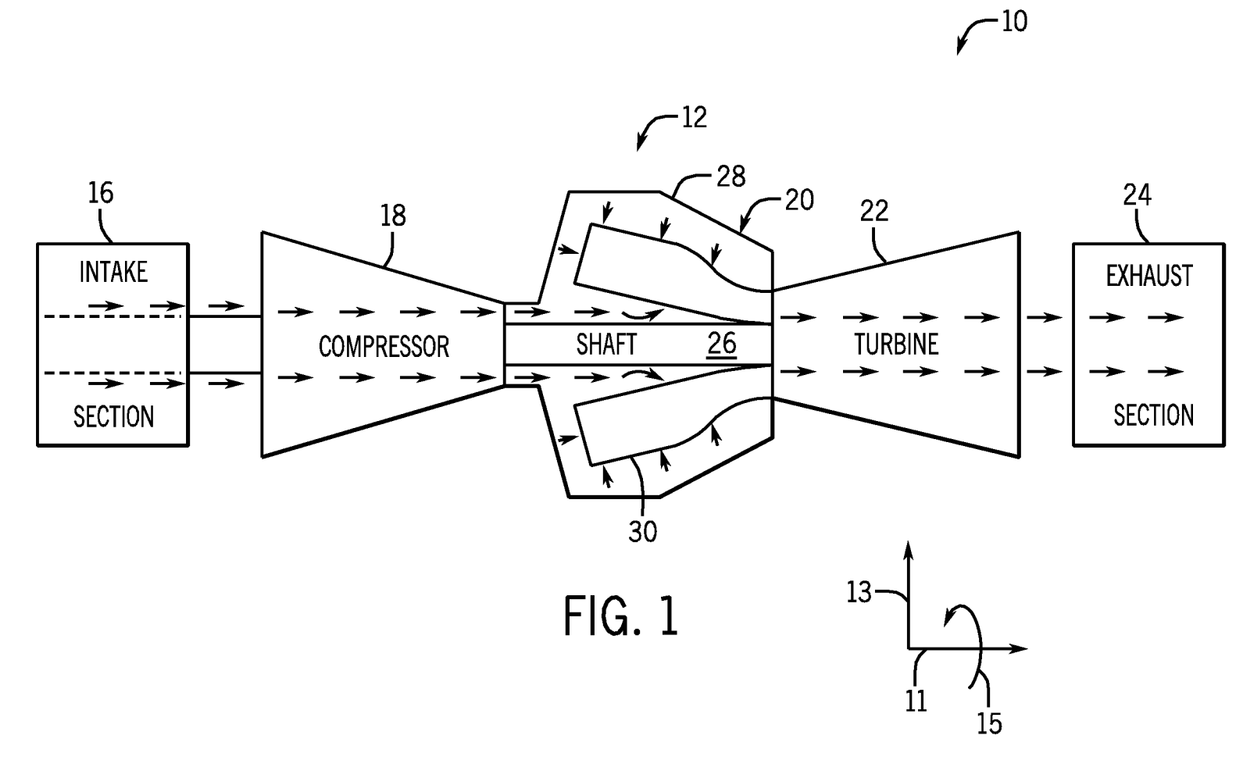
FIG. 1 is a schematic flow diagram of an embodiment of a gas turbine engine that may employ a heat recovery system.

FIG. 1 is a block diagram of an exemplary system 10 including a gas turbine engine 12 that may employ a heat recovery system as described in detail below. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30, where the compressed air may mix and combust with fuel within the combustors 30 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. As discussed below, the gas turbine engine 12 may include a heat recovery system used to transfer heat from gases exiting the exhaust section 24 to heat air coming into the air intake section 16. By heating the incoming air, the heat recovery system may lessen a buildup of ice in the compressor 18. Throughout the discussion presented herein, a set of axes will be referenced. These axes are based on a cylindrical coordinate system and point in an axial direction 11, a radial direction 13, and a circumferential direction 15.

Figure 2:
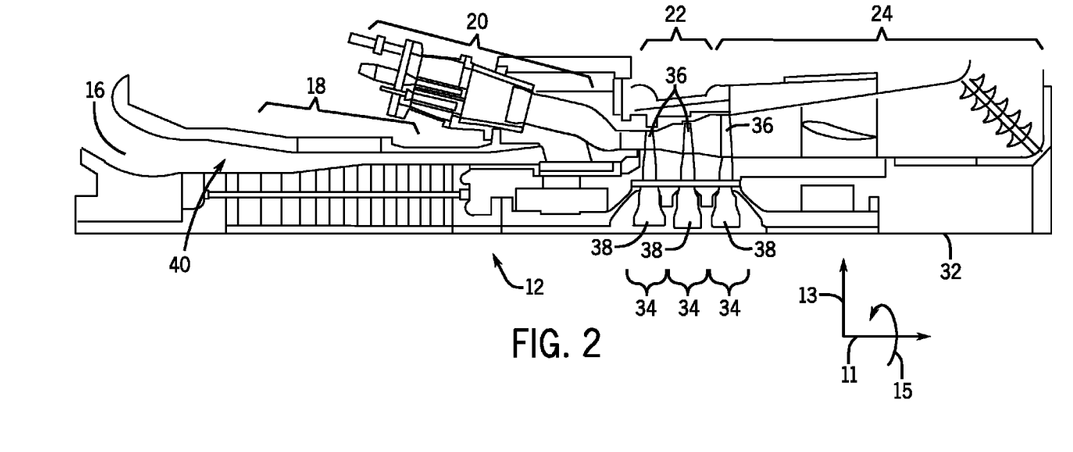
FIG. 2 is a cross-sectional side view of an embodiment of the gas turbine engine of FIG. 1 taken along a longitudinal axis.

FIG. 2 is a cross-sectional side view of an embodiment of the gas turbine engine 12 of FIG. 1 taken along a longitudinal axis 32. In operation, air enters through the air intake section 16 and is compressed by the compressor 18. The compressed air from the compressor 18 is then directed into the combustor section 20 where the compressed air is mixed with fuel. The mixture of compressed air and fuel is burned within the combustor section 20 to generate high-temperature, high-pressure combustion gases, which are used to generate torque within the turbine 22. As depicted, the turbine 22 includes three separate stages 34; however, the turbine 22 may include any number of stages 34. Each stage 34 includes a set of blades 36 coupled to a rotor wheel 38 that may be rotatably attached to the shaft 26 (FIG. 1). The blades 36 extend radially outward from the rotor wheels 38 and are partially disposed within the path of the hot combustion gases through the turbine 22. Specifically, the combustion gases apply motive forces to the blades 36 to rotate the rotor wheels 38 and, thus, the shaft 26. The rotation of the shaft 26 also causes the compressor 18 to rotate, such that one or more blades within the multi-stage compressor 18 draw in and pressurize the air received by the air intake section 16.

Certain conditions may lead to ice formation within an inlet 40 of the compressor 18. That is, the temperature and relative humidity of the air entering the compressor 18 through the air intake section 16 may be within ranges that promote the formation of ice in the inlet 40. For example, ice formation may occur in the inlet 40 of a given gas turbine engine 12 at temperatures of less than approximately 5 degrees Celsius and a relative humidity of at least approximately 65%. As blades within the compressor 18 pull the air into the compressor 18 for pressurization, ice that has formed in the inlet 40 may break free and be drawn into the compressor 18. Once released into the gas turbine engine 12, the ice may lead to undesirable performance of the compressor 18. To promote efficient operation of the gas turbine engine 12 during icing conditions, a heat recovery system may transfer heat from the exhaust section 24 to the air intake section 16 of the gas turbine engine 12. This may heat the incoming air, consequently reducing the formation of ice in the inlet 40 of the compressor 18. Similar techniques may be applied to heat air moving through other sections of the gas turbine engine 12, such as the combustor section 20 or the turbine 22.

Figure 3:
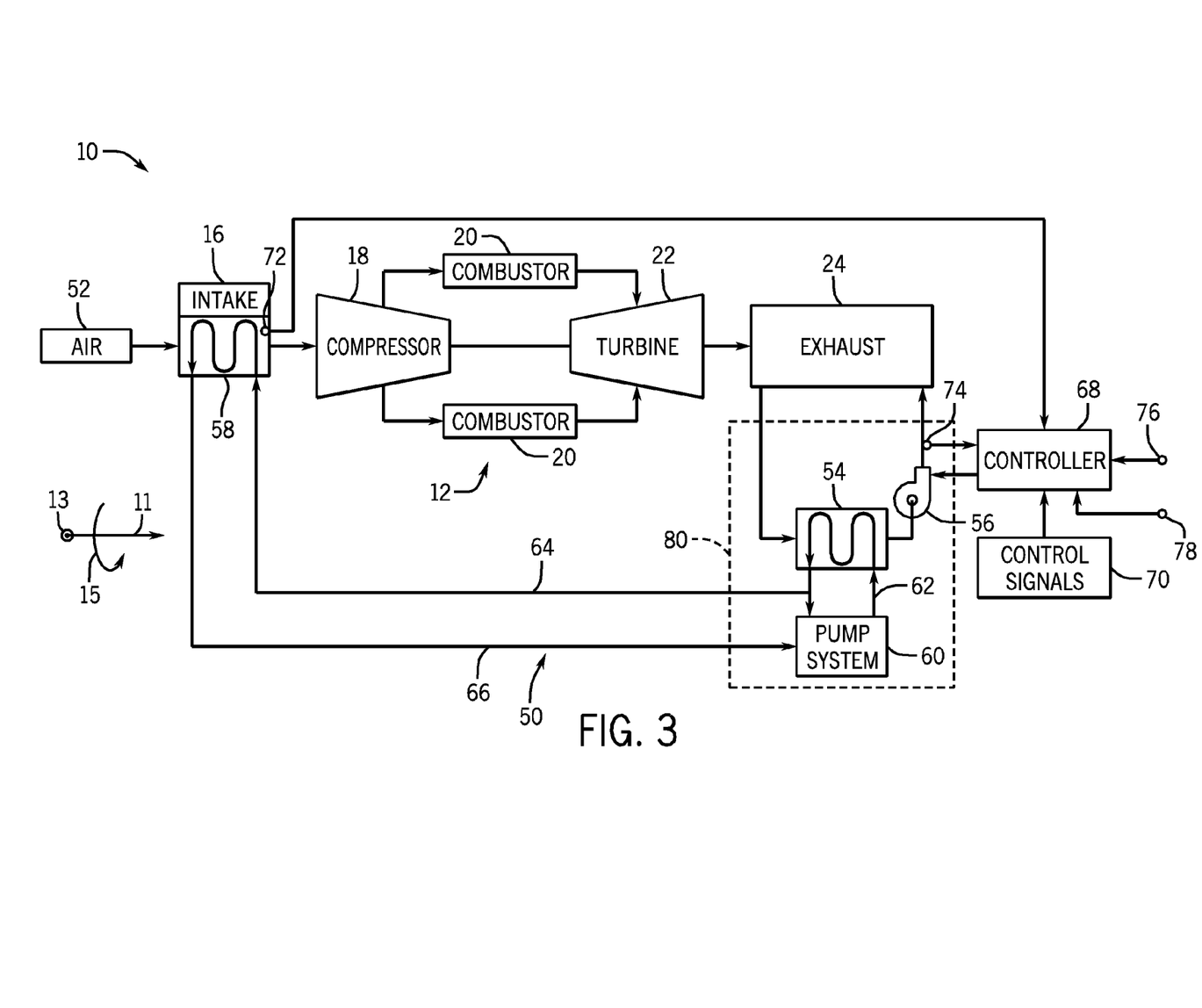
FIG. 3 is a schematic representation of an embodiment of the gas turbine engine of FIG. 1 having a heat recovery system.

FIG. 3 is a schematic representation of an embodiment of the system 10, including the gas turbine engine 12 of FIG. 1 having an anti-icing heat recovery system 50. The anti-icing heat recovery system 50 may be used to transfer heat from gases exiting the exhaust section 24 of the gas turbine engine 12 to air 52 entering the gas turbine engine 12. The anti-icing heat recovery system 50 includes, among other things, a first heat exchanger 54, a variable speed fan 56, and a second heat exchanger 58. The first heat exchanger 54 is designed to transfer heat from a working fluid (e.g., exhaust gases released through the exhaust section 24) to an intermediate heat transfer medium (e.g., anti-icing solution), and the second heat exchanger is designed to transfer heat from the anti-icing solution to the air 52 entering the gas turbine engine 12. The variable speed fan 56 is configured to urge the exhaust gases from the exhaust section 24 through the first heat exchanger 54. That is, the variable speed fan 56 may be designed to blow, draw, move, advance, or convey the exhaust gases from the exhaust section 24 through the first heat exchanger 54.

The variable speed fan 56 is operated using a variable frequency drive, magnetic drive, or other adjustable speed drive, allowing for adjustments of fan speed to be made. Such adjustments may proportionally affect the amount of heat transferred from the exhaust section 24 to the incoming air 52. In particular, increasing the fan speed of the variable speed fan 56 increases a volumetric capacity of exhaust gases passing through the first heat exchanger 54. The increased volumetric capacity leads to a proportional increase in the amount of heat transferred to the intermediate heat transfer fluid flowing through the first heat exchanger 54, which in turn increases the amount of heat transferred to the incoming air 52 through the second heat exchanger 58. Thus, the temperature of the air 52 entering the gas turbine engine 12 may be controlled by adjusting the fan speed of the variable speed fan 56.

The anti-icing heat recovery system 50 also may include a pump system 60 for circulating the anti-icing solution between the first and second heat exchangers 54 and 58. In the illustrated embodiment, the anti-icing solution may flow through a tube side of each of the first and second heat exchangers 54 and 58, although other arrangements may be possible. The anti-icing solution may be a mixture of water and common antifreeze, such as ethylene glycol. The pump system 60 may urge the anti-icing solution through a piping segment 62 toward the first heat exchanger 54. Relatively cooled anti-icing solution flows through tubes in the first heat exchanger 54, and the variable speed fan 56 blows relatively high temperature exhaust gases over the tubes in the first heat exchanger 54. Thus, the first heat exchanger 54 receives the exhaust gases and transfers heat from the exhaust gases to the cooled anti-icing solution to generate a heated anti-icing solution. The heated anti-icing solution flows from the first heat exchanger 54 to the second heat exchanger 58 through a piping segment 64. The second heat exchanger 58 receives the heated anti-icing solution and transfers heat from the heated anti-icing solution to the air 52 entering the gas turbine engine 12 through the air intake section 16. The anti-icing solution exits the second heat exchanger 58 at a relatively cooler temperature and returns to the pump system 60 through a piping segment 66. The pump system 60 may circulate the anti-icing solution at a relatively constant flow rate, thereby increasing the predictability of heat transfer performance of the heat exchangers 54 and 58. The second heat exchanger 58 may be located in the air intake section 16, as illustrated, or at some other location along the gas turbine engine 12, e.g., between the air intake section 16 and the compressor 18.

The illustrated anti-icing heat recovery system 50 includes a controller 68 for controlling the fan speed of the variable speed fan 56 based on control signals 70 and sensor feedback. The control signals 70 may include signals indicative of parameters input by an operator, such as a desired temperature for the air 52 entering the gas turbine engine 12, icing condition temperature ranges, pump flow rates, and the like. The sensor feedback may include data indicative of at least one of an inlet temperature of the air 52 entering the gas turbine engine 12, an exhaust temperature of the exhaust gases leaving the exhaust section 24, an ambient air temperature, or a relative humidity. Such sensor feedback may be obtained through sensors located about the system 10. For example, the controller 68 may receive the inlet temperature data from a temperature sensor 72 located in the air intake section 16 of the gas turbine engine 12. Likewise, the controller 68 may receive the exhaust temperature data from a temperature sensor 74 located downstream of the variable speed fan 56. Data indicative of ambient air temperature and relative humidity may be communicated to the controller 68 through sensors 76 and 78 located outside the gas turbine engine 12.

The controller 68 uses the control signals 70 and sensor feedback to adjust the fan speed of the variable speed fan 56. More specifically, the controller 68 interprets the sensor feedback to determine whether icing conditions exist near the air intake section 16 of the gas turbine engine 12. If icing conditions exist, the controller 68 may determine a desired air temperature for the air 52 entering the gas turbine engine 12, and adjust the fan speed of the variable speed fan 56 accordingly. As previously mentioned, a change in temperature of the anti-icing solution flowing through the second heat exchanger 58 may yield a predictable and proportional change in temperature of the air 52 passing through the second heat exchanger 58. Similarly, a change in fan speed of the variable speed fan 56 results in a proportional change in the temperature of the anti-icing solution flowing through the tubes of the first heat exchanger 54. Thus, relatively simple adjustments to the fan speed of the variable speed fan 56 may control an increase in temperature of the air 52 entering the gas turbine engine 12.

The controller 68 also may use feedback from the sensor 74 to monitor the temperature of exhaust gases exiting the first heat exchanger 54. A portion of the exhaust gas is ducted away from the exhaust section 24 to the first heat exchanger 54. The first heat exchanger 54 transfers heat from the exhaust gases to the anti-icing solution, and the exhaust gases exit the first heat exchanger 54 at a lower temperature. Therefore, increasing the fan speed of the variable speed fan 56 may further decrease the temperature of the exhaust gases that pass through the first heat exchanger 54. It may be undesirable for the temperature of the exhaust gases to decrease below an acid dew point temperature. When the exhaust gases drop below the acid dew point temperature, the gases may condense into a liquid acid against inner walls of components of the heat recovery system 50. Such acid formation is undesirable, as it may lead to corrosion of metal in the heat recovery system 50 and the exhaust section 24 as well as decreased system performance. To avoid this, the controller 68 may use sensor feedback and control signals 70 to control the variable speed fan 56 to heat the air 52 entering the gas turbine engine 12 while simultaneously maintaining the exhaust gas temperature above an acid dew point threshold value.

Certain components of the anti-icing heat recovery system 50 may be supported and integrated on a skid 80, which may be located adjacent to the gas turbine engine 12. In the illustrated embodiment, the skid 80 supports at least the first heat exchanger 54, the variable speed fan 56, and the pump system 60. The skid 80 also may support the controller 68, portions of various piping segments (e.g., 62, 64, 66), and ductwork. Integrating several components on the skid 80 in this way may reduce the footprint of the anti-icing heat recovery system 50, enabling relatively efficient construction, transportation, and installation of the anti-icing heat recovery system 50. Although the illustrated skid 80 is aligned relatively perpendicular to the gas turbine engine 12, other arrangements and relative orientations of the skid 80 may be possible. In some embodiments, the skid 80 may be aligned relatively parallel to the gas turbine engine 12, or in any suitable orientation for efficiently and integrally supporting the first heat exchanger 54, the variable speed fan 56, and the pump system 60, among other components.

Figure 4:
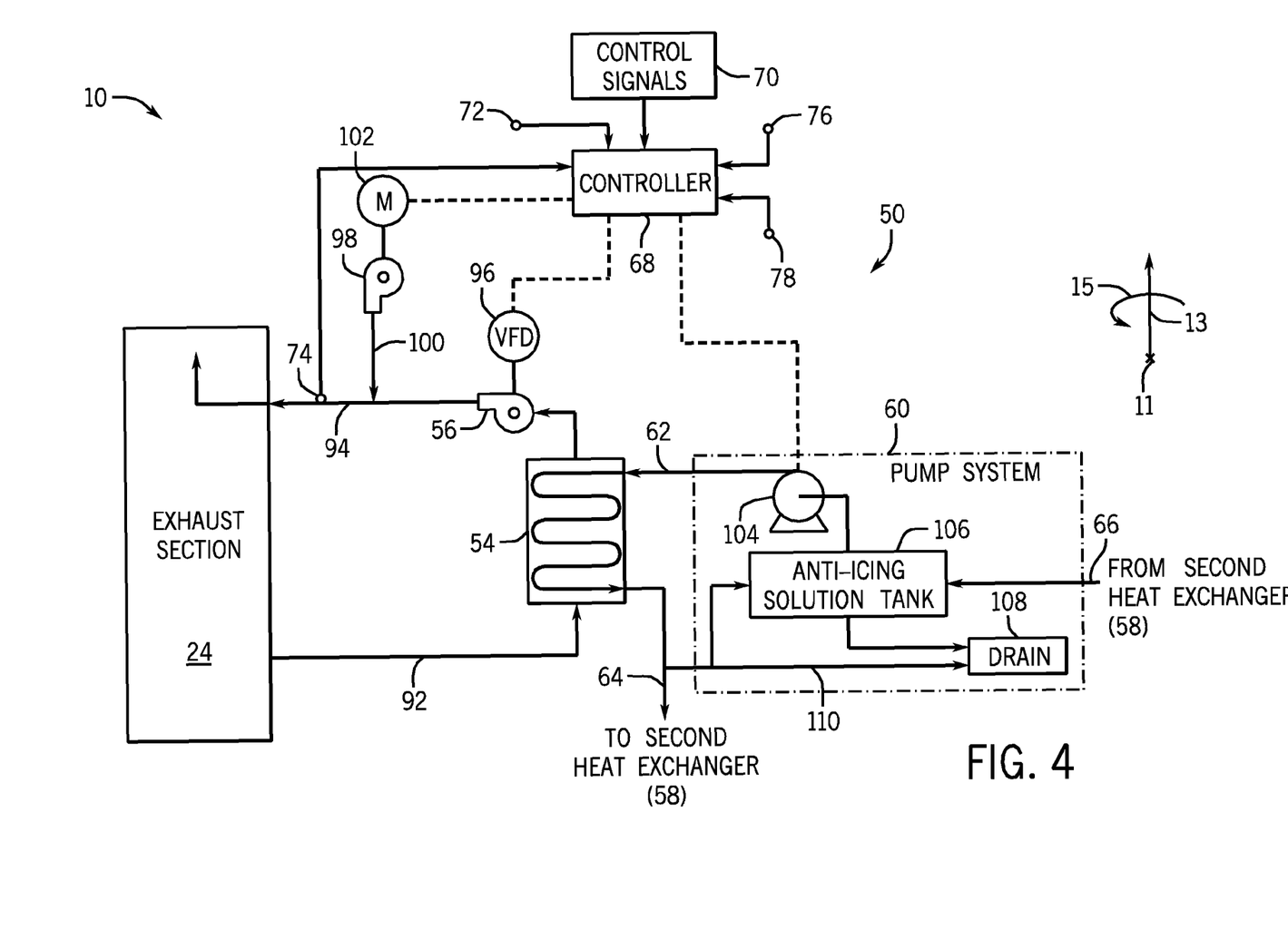
FIG. 4 is a schematic representation of an embodiment of certain components of the heat recovery system of FIG. 3.

FIG. 4 is a schematic representation of an embodiment of certain components of the anti-icing heat recovery system 50 of FIG. 3, which may be located alongside the exhaust section 24 of the gas turbine engine 12. It should be noted that FIG. 4 includes the components of the anti-icing heat recovery system 50, which may be supported by the skid 80 of FIG. 3. These components include, among other things, the first heat exchanger 54, the variable speed fan 56, the pump system 60, and the controller 68.

The variable speed fan 56 is designed to urge exhaust gases from the exhaust section 24 through a duct 92, across the first heat exchanger 54, and back to the exhaust section 24 through a duct 94. In the illustrated embodiment, the variable speed fan 56 is located along the duct 94 downstream of the first heat exchanger 54 and draws the exhaust gases through the first heat exchanger 54. Other embodiments may include the variable speed fan 56 positioned upstream of the first heat exchanger 54, blowing the exhaust gases across the first heat exchanger 54. The exhaust gases may pass through an expansion joint and a flange between the exhaust section 24 and the duct 92. The variable speed fan 56 urges the exhaust gases from the duct 92, across the first heat exchanger 54, and to the duct 94. From here, the exhaust gases may pass through another flange and an expansion joint before re-entering the exhaust section 24. Finally, the exhaust section 24 releases the exhaust gases from the gas turbine engine 12, possibly directing the gases toward another process of the system 10.

As previously mentioned, the variable speed fan 56 may be operated by a variable frequency drive (VFD) 96, which is configured to turn the variable speed fan 56 across a continuous range of different fan speeds in response to signals from the controller 68. The illustrated embodiment includes another fan 98 located along a duct 100 that intersects the duct 94 at a position downstream of the variable speed fan 56. The fan 98 may be a relatively small fan for delivering a low flow rate of air for purging the ducts 92 and 94. That is, the fan 98 may impede an undesirable flow of heated exhaust gases that otherwise may leak into the ducts 92 and 94. During conditions where no heat recovery is desired for reducing ice formation in the gas turbine engine 12, the fan 98 may supply purging airflow to inhibit exhaust gases from entering the ducts 92 and 94. A motor 102 operates the fan 98, and the motor 102 may be any motor for driving the fan 98 to provide the purge supply of air. The controller 68 may control the motor 102 based on the control signals 70 and sensor feedback. It should be noted that the motor 102 may be a VFD, similar to the VFD 96 that drives the variable speed fan 56, or the motor 102 may operate the fan 98 at one particular speed.

As illustrated in FIG. 4, the pump system 60 may include one or more pumps 104, an anti-icing solution tank 106, and a drain 108. The pumps 104 are configured to urge the anti-icing solution from the anti-icing solution tank 106 through the first and second heat exchangers 54 and 58. In particular, the pumps 104 may pump cooled anti-icing solution from the anti-icing solution tank 106 through the first heat exchanger 54. As mentioned previously, the first heat exchanger 54 may be designed for the anti-icing solution to travel through the tube side of the first heat exchanger 54, yielding relatively predictable heat exchanger performance. The first heat exchanger 54 may transfer heat from the exhaust gases to the anti-icing solution to generate a heated anti-icing solution. The heated anti-icing solution then travels toward the second heat exchanger 58 through the piping segment 64. The second heat exchanger 58 may transfer heat from the heated anti-icing solution to the air 52 entering the gas turbine engine 12. Finally, the anti-icing solution, now cooled, returns to the anti-icing solution tank 106 through the piping segment 66. The anti-icing solution may initially enter the pump system 60 as separate flows of anti-icing and water received by the anti-icing solution tank 106. The anti-icing solution may exit the pump system 60 through the drain 108.

The pumps 104 may urge the anti-icing solution through the first and second heat exchangers 54 and 58 at a generally constant speed. In this way, the variable speed fan 56 operates as a primary control for the heat transfer between the exhaust gases and the air 52 entering the gas turbine engine 12. In certain embodiments, the controller 68 may simply turn the pumps 104 on or off depending on the desired operation of the anti-icing heat recovery system 50. In other embodiments, the controller 68 may operate the pumps 104 at different flow rates based on the control signals 70 and sensor feedback.

As previously discussed, the skid 80 of FIG. 3 may support certain components of the anti-icing heat recovery system 50. These components, including the first heat exchanger 54, the variable speed fan 56, the pump system 60, and the fan 98, may be positioned relatively close to each other on the skid 80. The skid 80, with integrated components of the anti-icing heat recovery system 50, may be compatible with a wide variety of gas turbine engines 12. However, other components such as the piping segments 64 and 66 and the second heat exchanger 58 may be designed for a specific gas turbine engine 12. In order for the same pump system 60 to work with different gas turbine engines 12, it may be desirable for the pump system 60 to include certain features that allow for adjustable flow rates, anti-icing solution concentrations, and/or anti-icing solution temperatures. For example, a piping segment 110 may route a portion of the heated anti-icing solution from the first heat exchanger 54 to the anti-icing solution tank 106, thereby altering the flow of the heated anti-icing solution flowing toward the second heat exchanger 58. Valves (e.g., check valves, ball valves, butterfly valves, etc.) located along the piping segments 62, 64, 66, and 110 of the pump system 60 may allow an operator to adjust default settings of the pump system 60. For example, the same pump system 60 may be adjusted to operate efficiently with different gas turbine engines 12 and/or under different ambient temperature settings. In addition, the same pump system 60 may be adjusted to deliver anti-icing solution with a desired anti-icing concentration.

The controller 68 may control operation of the VFD 96, the motor 102, the pumps 104, and other components of the pump system 60, such as valves. The controller 68 may operate these components based on sensor feedback and/or the control signals 70, which may be input by operators or received from another system. As in FIG. 3, the controller 68 may monitor parameters such as air intake temperature, exhaust temperature, ambient temperature, and relative humidity using sensors 72, 74, 76, and 78 located throughout the anti-icing heat recovery system 50. Certain embodiments may include additional sensors located within the anti-icing heat recovery system 50, such as temperature sensors located throughout the piping segments 62, 64, 66, and 110 of the pump system 60 or in the ducts 92 and 94. Some embodiments may include additional sensors located in different sections of the gas turbine engine 12.

The controller 68 may execute hardware or software control algorithms to regulate operation of the anti-icing heat recovery system 50. According to exemplary embodiments, the controller 68 may include an analog to digital (A/D) converter, one or more microprocessors or general or special purpose computers, a non-volatile memory, memory circuits, and an interface board. For example, the controller 68 may include memory circuitry for storing programs and control routines and algorithms implemented for control of the various system components, such as the VFD 96 of the variable speed fan 56. The controller 68 also includes, or is associated with, input/output circuitry for receiving sensed signals from the sensors 72, 74, 76, and 78, and interface circuitry for outputting control signals for at least the VFD 96, the fan motor 102, and the pumps 104. Memory circuitry may store set points, actual values, historic values, and so forth for any or all such parameters. Other devices may, of course, be included in the system, such as additional pressure and/or temperature transducers or switches that sense temperatures and pressures of the anti-icing solution, the heat exchangers 54 and 58, the compressor 18, the anti-icing solution tank 106, and so forth. Further, other values and/or set points based on a variety of factors, such as gas turbine engine operation, ambient temperature, relative humidity, and the like may be used to determine when and how to operate the anti-icing heat recovery system 50. The controller 68 also may include components for operator interaction with the system, such as display panels and/or input/output devices for checking operating parameters, inputting the control signals 70 representative of set points and desired operating parameters, checking error logs and historical operations, and so forth.

The controller 68 uses the available sensor feedback to control the anti-icing heat recovery system 50 by adjusting the fan speed of the variable speed fan 56. The controller 68 may increase the fan speed to increase or decrease the amount of heat transferred through the heat exchangers 54 and 58. This may increase the temperature of the air 52 entering the gas turbine engine 12, thereby reducing the amount of ice formed within the compressor 18. However, it may be undesirable for the controller 68 to increase the fan speed such that the exhaust temperature increases above an acid dew point threshold value. Therefore, the controller 68 may employ specific control schemes for reducing ice formation in the compressor 18 without allowing acid to form in the duct 94.

Figure 5:
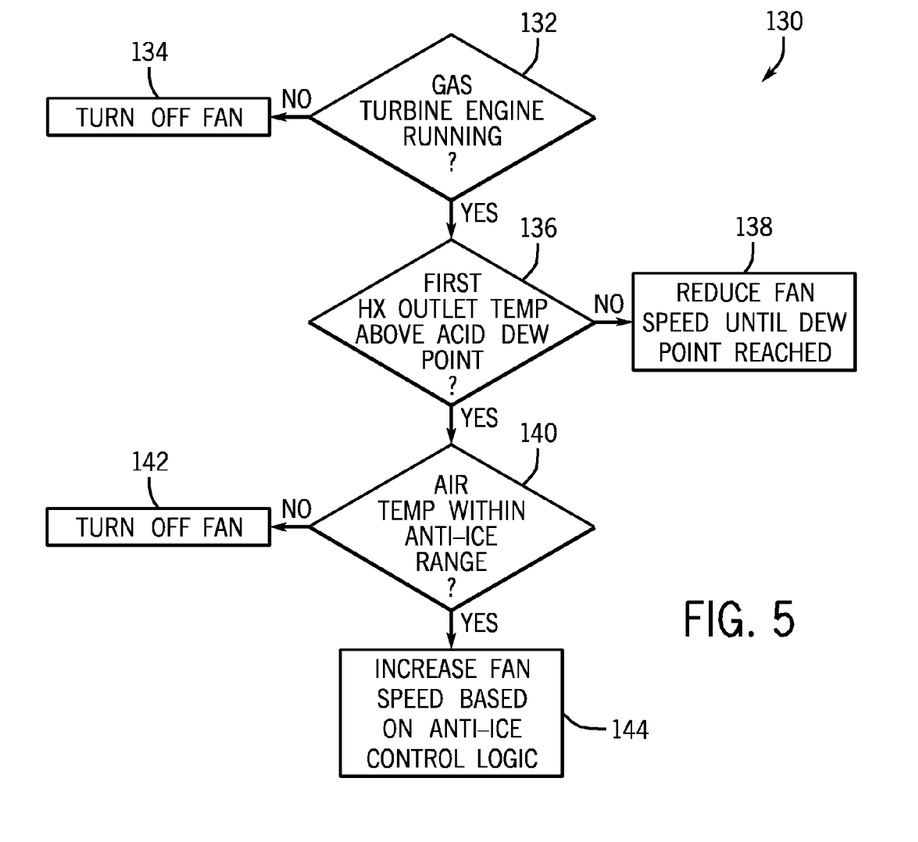
FIG. 5 is a process flow diagram of an embodiment of a control scheme for controlling the heat recovery system of FIG. 3.

FIG. 5 is a process flow diagram of an embodiment of a method 130 for controlling the anti-icing heat recovery system 50 in accordance with present techniques. It should be noted that the method 130 may be implemented as a computer or software program (e.g., code or instructions) that may be executed by a processor to execute one or more of the steps of the method 130. Additionally, the program (e.g., code or instructions) may be stored in any suitable article of manufacture that includes at least one tangible non-transitory, computer-readable medium that at least collectively stores these instructions or routines, such as a memory or storage component of the controller 68.

The method 130 begins with determining (block 132) if the gas turbine engine 12 is running. The controller 68 may receive data indicative of the current operational state of the gas turbine engine 12 from one or more sensors in the gas turbine engine 12, or via the control signals 70. If the gas turbine engine 12 is not running, the controller 68 may send a signal to the VFD 96 to turn off (block 134) the variable speed fan 56. For anti-icing heat recovery systems 50 having the fan 98 for purging the system, the block 134 may include turning on or maintaining operation of the fan 98. The operation of the fan 98 may inhibit the flow of exhaust gases into the ducts 92 and 94 when no heat recovery is desired. However, some embodiments of the method 130 may include turning off the variable speed fan 56 and any other fans when the gas turbine engine 12 is not running.

If the gas turbine engine 12 is running, the controller 68 determines (block 136) if the exhaust temperature of gases exiting the first heat exchanger 54 is above the acid dew point threshold value of the exhaust gases. When the temperature of the gases exiting the first heat exchanger 54 drops below the acid dew point, acid may begin to form, corroding the metal interior of components (e.g., the duct 94) of the anti-ice system 50 and exhaust section 24. The acid dew point threshold value used in the determination of the block 136 may be slightly higher than the actual acid dew point temperature of the exhaust gases. The acid dew point threshold value may be approximately 180 degrees Celsius, depending on the consistency of the exhaust gas. If exhaust temperature is less than or equal to the acid dew point threshold value, the controller 68 may reduce (block 138) the fan speed of the variable speed fan 56 until the acid dew point temperature is reached. That is, the controller 68 will send a control signal to the VFD 96 of the variable speed fan 56 to reduce the fan speed and, consequently, reduce the amount of heat transferred from the exhaust gases to the air 52 entering the gas turbine engine 12. When the temperature of the exhaust gases exiting the first heat exchanger 54 increases above the acid dew point threshold value, the controller 68 may stop reducing the fan speed of the variable speed fan 56.

If the exhaust temperature is above the acid dew point threshold value, the controller 68 may determine (block 140) if the temperature of the air 52 entering the gas turbine engine 12 is within an anti-ice temperature range. The anti-ice temperature range is a range of air temperatures that generally lead to ice formation in the inlet 40 of the gas turbine engine 12. The air temperature may be an ambient air temperature monitored by the temperature sensor 76 located outside the gas turbine engine 12. In other embodiments, the air temperature may be monitored from sensors located within the air intake section 16 of the gas turbine engine 12. The anti-ice temperature range may be approximately −15 to 8 degrees Celsius, although this temperature range may vary across different gas turbine engines 12, and the range may be affected by the relative humidity of the air 52. For example, the formation of ice in the inlet 40 may be unlikely when the air 52 has a relative humidity of less than approximately 65 percent, regardless of the air temperature.

If the air temperature is outside the anti-ice temperature range (e.g., less than −15 or greater than 8 degrees Celsius), the controller 68 may turn off (block 142) the variable speed fan 56, because no anti-icing heat recovery is desired outside of this range. At temperatures below the range, the humidity of the air 52 may be too low for ice to form in the compressor 18, and at temperatures above the range, the air 52 may be too warm for ice to form in the compressor 18. If the air temperature is within the anti-ice temperature range (e.g., between −15 and 8 degrees Celsius), the controller 68 increases (block 144) the fan speed of the variable speed fan 56 based on anti-ice control logic. The anti-ice control logic may be an input/output relationship relating the ambient temperature of the air 52 entering the gas turbine engine 12 with the inlet temperature of the air after passing through the second heat exchanger 58. The controller 68 may monitor the inlet temperature using the sensor 72 located downstream of the second heat exchanger 58. Once the desired inlet temperature, as determined by the anti-icing control logic, is reached, the controller 68 may maintain the fan speed of the variable speed fan 56.

It should be noted that the method 130 may be repeatedly executed by the controller 68 throughout operation of the anti-icing heat recovery system 50. The method 130 may provide desired anti-icing of the inlet 40 using the exhaust gases from the gas turbine engine 12, while maintaining an appropriate temperature of the exhaust gases exiting through the exhaust section 24. That is, the method 130 may be applied to reduce both ice formation in the inlet 40 and acid formation in the heat recovery system 50. As illustrated, the method 130 may first control for reducing acid formation and then control for reducing ice formation. However, other embodiments may enable the controller 68 to control for reducing ice formation before reducing acid formation. As the method 130 is repeated, the fan speed of the variable speed fan 56 may be increased multiple times if the exhaust temperature remains above the acid dew point threshold value and the air temperature remains within the anti-ice temperature range.

Figure 6:
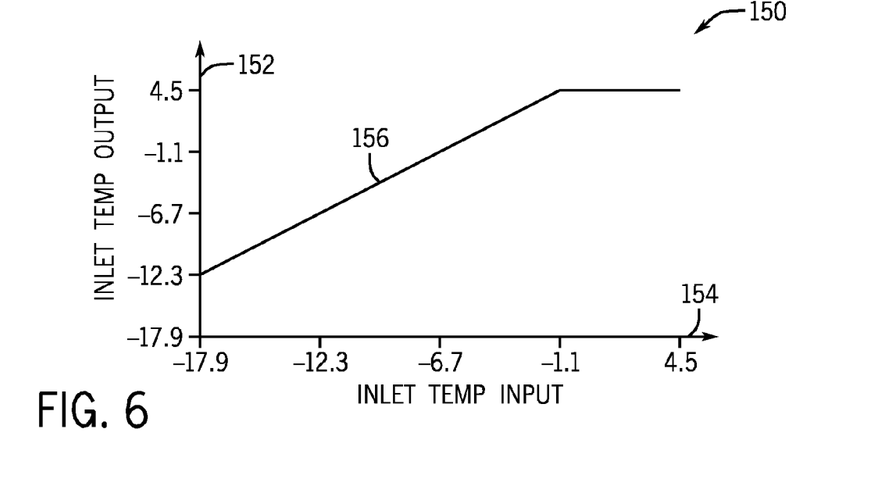
FIG. 6 is a graph illustrating an embodiment of an input/output relationship of gas turbine inlet air temperature.

FIG. 6 is a graph 150 modeling an embodiment of an input/output relationship of inlet air temperature, in accordance with the anti-icing control logic used by the controller 68. The graph 150 illustrates inlet temperature output (ordinate 152) against inlet temperature input (abscissa 154) within the anti-ice temperature range. More specifically, the inlet temperature input may be the temperature of the air 52 entering the gas turbine engine 12 before blowing across the second heat exchanger 58. Similarly, the inlet temperature output may be the temperature of the air 52 after blowing across the second heat exchanger 58, having received an increased amount of heat from the anti-icing solution flowing through tubes in the second heat exchanger 58. A trace 156 indicates one possible input/output relationship for air temperatures within an anti-ice temperature range (−17.9 to 4.5 degrees Celsius), although other relationships may be possible. The trace 156 shows that when the temperature of the air 52 exiting the second heat exchanger 58 is between −17.9 and −1.1 degrees Celsius, the controller 68 may increase the fan speed such that the second heat exchanger 58 transfers an additional amount of approximately 5.6 degrees Celsius to the air 52. When the temperature of the air 52 exiting the second heat exchanger 58 is between −1.1 and 4.5 Celsius, the controller 68 may increase the fan speed such that the temperature of the air 52 exiting the second heat exchanger 58 is approximately 4.5 degrees Celsius. The controller 68 may determine the desired amount of heat to transfer from the exhaust gases to the air 52, according to the input/output relationship indicated by the trace 156, and increase the fan speed of the variable speed fan 56 accordingly.

The illustrated relationship includes a relatively gradual increase in temperature of the air 52 entering the gas turbine engine 12 through the second heat exchanger 58. This gradual temperature increase may be useful for maintaining the exhaust temperature of the exhaust gases exiting the first heat exchanger 54 above the acid dew point threshold value. As discussed in reference to FIG. 5, the method 130 may be repeated, allowing the gradual temperature increase to be applied multiple times. As long as the exhaust temperature remains above the acid dew point threshold value and the inlet temperature input remains within the anti-ice temperature range, the input/output relationship may be applied again through additional increases in the fan speed of the variable speed fan 56. As previously mentioned, an increase in the fan speed may cause a proportional increase in the heat transferred between the exhaust gases and the anti-icing solution in the first heat exchanger 54, as well as between the heated anti-icing solution and the air 52 in the second heat exchanger 58. In this way, the anti-icing heat recovery system 50 may facilitate efficient and predictable control of the amount of heat transferred to the incoming air 52 using the variable speed fan 56.

Technical effects of the invention include, among other things, reducing the amount of ice formed in the compressor inlet of the gas turbine engine during icing conditions. The anti-icing heat recovery system uses two heat exchangers, one to transfer heat from turbine exhaust gases to an anti-icing solution, and the other to transfer heat from the heated anti-icing solution to the air entering the gas turbine engine. The anti-icing solution may be pumped through the tube side of both heat exchangers at a relatively constant flow rate, allowing for relatively predictable heat exchanger performance. The controller may control the amount of heat transferred from the exhaust gases to the incoming air solely by adjusting the fan speed of the variable speed fan. Indeed, this may enable the controller to execute simpler and more efficient control schemes. The controller may operate the variable speed fan according to control schemes that maintain the exhaust gas temperature above an acid dew point threshold value, while transferring heat to the gas turbine inlet to reduce ice formation. The variable speed fan, first heat exchanger, and pump system may be arranged on a single skid, facilitating relatively easy transportation and installation (e.g., including retrofitting into existing gas turbine engines) of the anti-icing heat recovery system. In addition, certain piping segments, sensors, and valves throughout the pump system may be adjustable so that the same components arranged on the skid may be compatible with a variety of gas turbine engines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine engine; and
an anti-icing heat recovery system, comprising:
a first heat exchanger configured to receive a working fluid from an exhaust section of the gas turbine engine and to transfer heat from the working fluid to a cooled intermediate heat transfer medium to generate a heated intermediate heat transfer medium;
a second heat exchanger configured to receive the heated intermediate heat transfer medium from the first heat exchanger and to transfer heat from the heated intermediate heat transfer medium to air entering the gas turbine engine;
a variable speed fan configured to urge the working fluid from the exhaust section of the gas turbine engine through the first heat exchanger and to return the working fluid to the exhaust section; and
a controller configured to control a fan speed of the variable speed fan based on sensor feedback indicative of an inlet temperature of the air entering the gas turbine engine and an exhaust temperature of the working fluid, wherein the controller is configured to reduce the fan speed of the variable speed fan when the exhaust temperature of the working fluid is less than or equal to a threshold acid dew point temperature, and to modulate the fan speed of the variable speed fan when the exhaust temperature of the working fluid is above the threshold acid dew point temperature and the inlet temperature of the air entering the gas turbine engine is within an anti-icing range, wherein the controller is configured to modulate the fan speed of the variable speed fan to provide anti-icing to the gas turbine engine only when the exhaust temperature of the working fluid is above the threshold acid dew point temperature.

2. The system of claim 1, wherein the second heat exchanger is disposed in an air intake section of the gas turbine engine, and the air intake section of the gas turbine engine is configured to direct air from outside the gas turbine engine through the second heat exchanger and to a compressor of the gas turbine engine.

3. The system of claim 1, wherein the anti-icing heat recovery system comprises a pump system having one or more pumps configured to urge the intermediate heat transfer medium from an anti-icing solution tank through the first and second heat exchangers.

4. The system of claim 3, comprising a skid configured to support at least the first heat exchanger, the pump system, and the variable speed fan.

5. A system, comprising:
an anti-icing heat recovery system, comprising:
a first heat exchanger configured to receive a working fluid from an exhaust section of a gas turbine engine and to transfer heat from the working fluid to a cooled intermediate heat transfer medium to generate a heated intermediate heat transfer medium;
a second heat exchanger configured to receive the heated intermediate heat transfer medium from the first heat exchanger and to transfer heat from the heated intermediate heat transfer medium to air entering the gas turbine engine;
a variable speed fan configured to urge the working fluid from the exhaust section of the gas turbine engine through the first heat exchanger;
an exhaust temperature sensor configured to measure an exhaust temperature of the working fluid;
an inlet temperature sensor configured to measure an inlet temperature of the air entering the gas turbine engine; and a controller communicatively coupled to and configured to receive feedback indicative of the exhaust temperature and the inlet temperature from the exhaust temperature sensor and the inlet temperature sensor, respectively, and to control a fan speed of the variable speed fan to maintain the exhaust temperature above a threshold acid dew point temperature and to provide anti-icing to the gas turbine engine, wherein the controller is figured to control the fan speed of the variable speed fan to the first maintain the exhaust temperature above the threshold acid dew point temperature, and to provide anti-icing to the gas turbine engine only when the exhaust temperature is above the threshold acid dew point temperature.

6. The system of claim 5, comprising a skid configured to support at least the first heat exchanger, a pump system, and the variable speed fan.

7. The system of claim 5, wherein the second heat exchanger is disposed in an air intake section of the gas turbine engine, and the air intake section of the gas turbine engine is configured to direct air from outside the gas turbine engine through the second heat exchanger and to a compressor of the gas turbine engine.

8. The system of claim 5, wherein the controller is configured to reduce the fan speed of the variable speed fan when the exhaust temperature of the working fluid is less than or equal to the threshold acid dew point temperature.

9. The system of claim 8, wherein the controller is configured to modulate the fan speed of the variable speed fan when the exhaust temperature of the working fluid is above the threshold acid dew point temperature and the inlet temperature of the air entering the gas turbine engine is greater than a lower anti-ice temperature threshold and less than an upper anti-ice temperature threshold.

10. The system of claim 5, comprising the gas turbine engine having the anti-icing heat recovery system.

11. The system of claim 5, wherein the controller is configured to control the fan speed of the variable speed fan based on the exhaust temperature, the inlet temperature, an ambient air temperature, and a relative humidity.

12. The system of claim 5, wherein the anti-icing heat recovery system comprises a pump system comprising an anti-icing solution tank and a pump configured to urge the intermediate heat transfer medium from the anti-icing solution tank through tubes in the first and second heat exchangers.

13. The system of claim 12, wherein the pump system is configured to urge the intermediate heat transfer medium through the tubes in the first and second heat exchangers at an approximately constant flow rate.

14. The system of claim 12, wherein the pump system comprises valves disposed along at least one of a plurality of piping segments, the plurality of piping segments being disposed between the pump and the tubes in the first heat exchanger, between the tubes in the second heat exchanger and the anti-icing solution tank, between the tubes in the first heat exchanger and the tubes in the second heat exchanger, and between the tubes in the second heat exchanger and a drain, wherein the valves are adjustable to adjust at least one of a flow rate of the anti-icing solution through the pump system, a concentration of the anti-icing solution flowing through the pump system, and a temperature of the anti-icing solution flowing through the pump system.

15. The system of claim 5, wherein the controller is configured to modulate the fan speed of the variable speed fan when the inlet temperature of the air entering the gas turbine engine is greater than a lower anti-ice temperature threshold and less than an upper anti-ice temperature threshold.

16. A method, comprising:
controlling a fan speed of a variable speed fan, the variable speed fan being configured to urge a working fluid from an exhaust section of a gas turbine engine through a first heat exchanger configured to transfer heat from the working fluid to a cooled intermediate heat transfer medium to generate a heated intermediate heat transfer medium for heating air entering the gas turbine engine, based on data indicative of at least an inlet temperature of the air entering the gas turbine engine and an exhaust temperature of the working fluid, wherein controlling the fan speed of the variable speed fan comprises:
determining whether the exhaust temperature of the working fluid is above a threshold acid dew point temperature;
reducing the fan speed when the exhaust temperature of the working fluid is less than or equal to the threshold acid dew point temperature;
when the exhaust temperature of the working fluid is above the threshold acid dew point temperature, determining whether the inlet temperature of the air entering the gas turbine engine is within an anti-ice temperature range; and
modulating the fan speed when the inlet temperature of the air entering the gas turbine engine is within the anti-ice temperature range.

17. The method of claim 16, comprising receiving, via a controller, the data indicative of at least the inlet temperature of the air entering the gas turbine engine and the exhaust temperature of the working fluid from sensors communicatively coupled to the controller, and controlling the fan speed of the variable speed fan via the controller.

18. The method of claim 16, comprising:
controlling the fan speed of the variable speed fan based on the inlet temperature of the air entering the gas turbine engine, the exhaust temperature of the working fluid, and a relative humidity;
determining whether the inlet temperature and the relative humidity are within the anti-icing temperature range and an anti-icing humidity range, respectively; and
modulating the fan speed when the inlet temperature of the air entering the gas turbine engine and the relative humidity are within the anti-icing temperature and humidity ranges.

* * * * *